No. 794,473. PATENTED JULY 11, 1905.
A. E. VINCENT.
MACHINE FOR MANUFACTURING PNEUMATIC WHEEL TIRES.
APPLICATION FILED APR. 7, 1905.
4 SHEETS—SHEET 1.
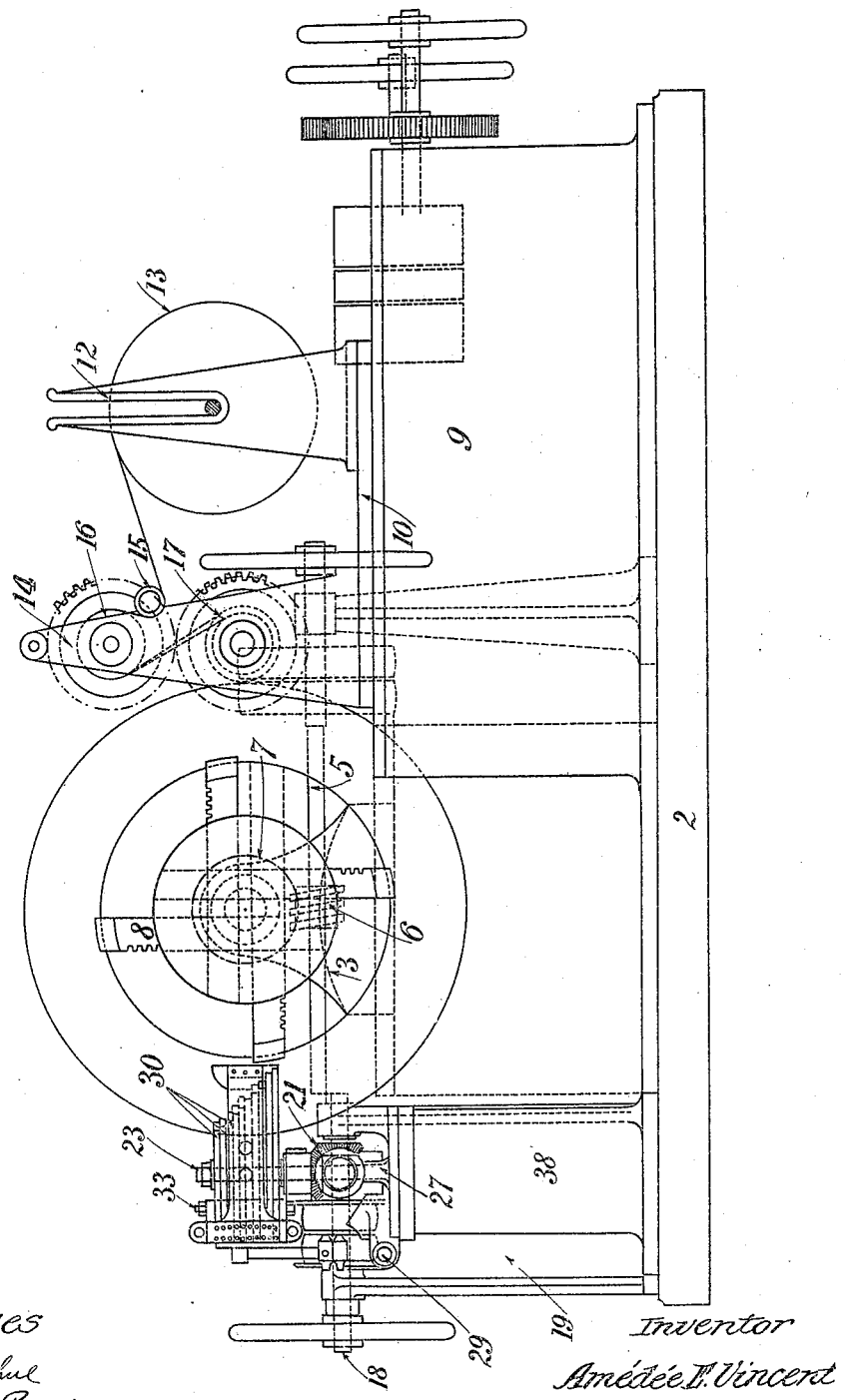
Witnesses
H. M. Kuehne
John A. Percival.
Inventor
Amédée E. Vincent
ATTORNEYS No. 794,473. PATENTED JULY 11, 1905.
A. E. VINCENT.
MACHINE FOR MANUFACTURING PNEUMATIC WHEEL TIRES.
APPLICATION FILED APR. 7, 1905.
4 SHEETS—SHEET 2.
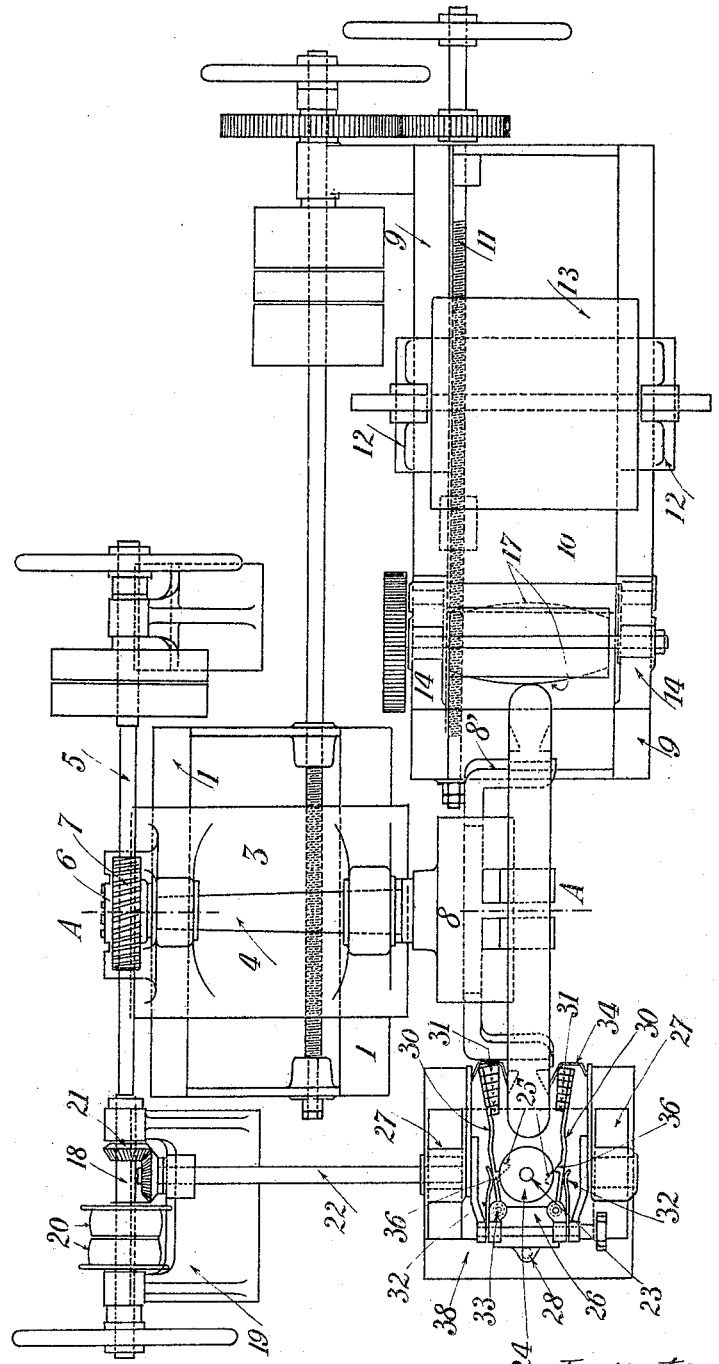
FIG. 2.
Witnesses
H. M. Kuhul
John A. Percival.
Inventor
Amédée E. Vincent
BY Richardson
ATTORNEYS No. 794,473. PATENTED JULY 11, 1905.
A. E. VINCENT.
MACHINE FOR MANUFACTURING PNEUMATIC WHEEL TIRES.
APPLICATION FILED APR. 7, 1905.
4 SHEETS—SHEET 3.
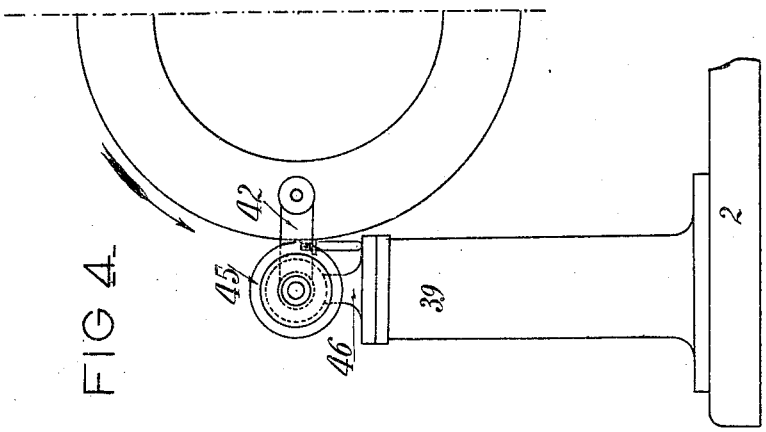
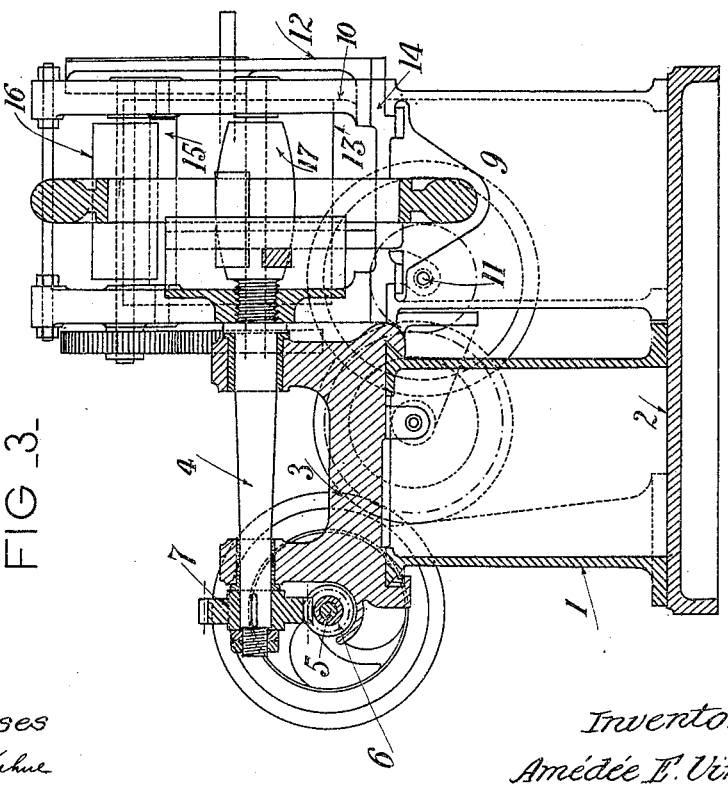
Witnesses
J. M. Kuhne
John A. Percival
Inventor
Amédée E. Vincent
ATTORNEYS No. 794,473. PATENTED JULY 11, 1905.
A. E. VINCENT.
MACHINE FOR MANUFACTURING PNEUMATIC WHEEL TIRES.
APPLICATION FILED APR. 7, 1905.
4 SHEETS—SHEET 4.
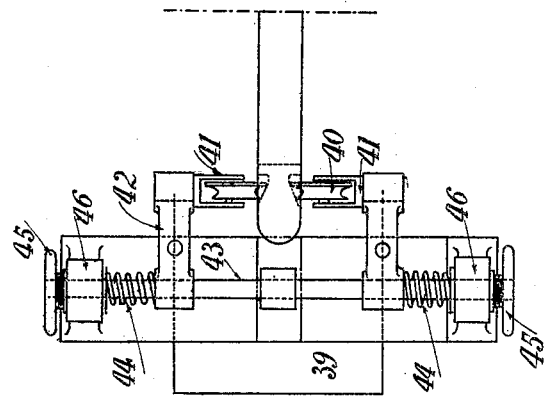
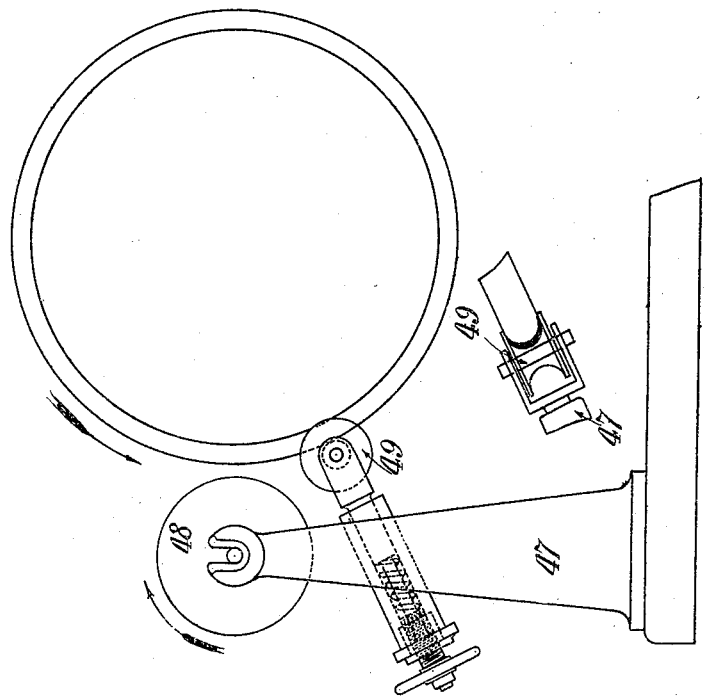
Witnesses
H. M. Kuehne
John G. Percival
Inventor
Amédée E. Vincent
By 
ATTORNEYS No. 794,473.

Patented July 11, 1905.

UNITED STATES PATENT OFFICE.

AMÉDÉE ETIENNE VINCENT, OF NOISY-LE-SEC, FRANCE.

MACHINE FOR MANUFACTURING PNEUMATIC WHEEL-TIRES.

SPECIFICATION forming part of Letters Patent No. 794,473, dated July 11, 1905.

Application filed April 7, 1905. Serial No. 254,412.

*To all whom it may concern:*

Be it known that I, AMÉDÉE ETIENNE VINCENT, civil engineer, a citizen of France, residing at 25 Boulevard Gambetta, Noisy-le-Sec, Seine, France, have invented new and useful Improvements in Machines for Manufacturing Pneumatic Wheel-Tires, of which the following is a specification.

As is known, a pneumatic tire is made up of several layers of canvas cut in strips on a bias at forty-five degrees and of suitable breadth, two beads or flanges inserted at the base of the canvas, and an exterior layer of rubber for resisting friction.

This invention has for its object a machine for the mechanical production of these tires, enabling, first, to shape and stretch the canvas layers exactly to the same amount whatever be their number, so as to permit the different elements of the tire to work equally. By means of this machine canvas layers are mechanically applied and superposed in suitable number on a metallic matrix or former, and likewise the clenching beads or flanges of the tire and the exterior coating of rubber are mechanically set in place.

In the annexed drawings, Figure 1 is an elevation of the improved machine arranged to apply the canvas on the former. Fig. 2 is a plan view projected from Fig. 1. Fig. 3 is a transverse section along the line A A of Fig. 2. Figs. 4 and 5 show in elevation and in plan the arrangement serving to fix the beads on the tire. Fig. 6 shows the arrangement for applying and securing the tread.

The machine is constructed generally as follows:

A slide frame 1 is fixed on a sole-plate 2. The frame 1 carries a bracket 3, receiving a shaft 4, whose rotary movement is effected from a shaft 5, having a worm 6, operating a worm-wheel 7, keyed on the shaft 4. The other extremity of the shaft 4 is threaded and receives a plate 8 with four extensible arms 8'. On these arms there is placed the metal matrix or former intended to receive the canvas. A second frame 9 is mounted on the sole-plate 2, so that its axis will be in the same plane as the axis of the said matrix or former. On this frame 9 slides a carriage 10, whose movement is effected by a screw 11 engaging a nut fixed to the carriage. On this carriage 10 are fixed two supports 12, which receive a bobbin or reel 13, on which is wound the canvas for making up the tire. The carriage 10 carries also two other supports 14, between which are rotatably carried three rollers 15, 16, and 17. The roller 15 serves merely as a guide for the canvas. The rollers 16 and 17 are driven from each other by two toothed wheels of suitable diameter. The roller 16 is cylindrical. The roller 17 is bulbed in such a manner that the canvas which it receives from the roller 16 is at the middle developed to equal the summit or apex of the former or matrix, while the edges are developed corresponding to the edges of the former or matrix. The shape thus taken by the canvas permits of applying it to the former, covering the same perfectly. The canvas travels along the path indicated by the arrows, then is drawn on the former, which has previously received a coating of rubber solution to permit of the adhesion of the canvas and to insure its being turned with the former, which rotates with the plate 8.

The application of the first layer of the canvas on the former, then of the second on the first, and so on, is insured as follows: A shaft 18, carried by a support 19, fixed on the soleplate, receives its movement from a system of fast and loose pulleys 20. Bevels 21 transmit motion to a shaft 22, which at its other extremity, also through bevels, drives a vertical shaft 23. On this shaft 23 are mounted a certain number of cams 24, each having two notches 25 opposite each other. The shaft 23 is mounted on a block 26, provided with two trunnions, permitting the same to rock between two supports 27 and to swing back to disengage the former. The block 26 carries at each side a series of levers 30 of unequal length, so that each of the hammers with which each lever is provided at its extremity projects a little beyond the preceding hammer. The whole of the hammers on each side constitutes a step system, as shown in Fig. 1, and all the hammers thus strike upon the face of the former. The levers are each provided with a catch or tappet 36 and are pressed by springs 32. Each group of levers is mounted on the same shaft 33 at one side. When the shaft 23, on which are fixed the cams 24, makes a movement of rotation, the levers 30 remain superposed in the position indicated in Fig. 2 until the notches of the uppermost cam come opposite the tappets fixed on the two upper symmetrical levers. At this moment these two levers, always pressed by their springs, strike simultaneously upon the canvas on the former, then are immediately afterward raised by the cam, whose rotary movement continues. The second cam keyed beneath the first on the same shaft presents in turn its notches to the second pair of levers the hammers of which strike the canvas as did the first, and so on until the last set of levers, and this while the former, itself rotated in the direction of the arrow, presents successively all its surface to the blows of the small hammers, which first apply the first layer of canvas on the former and insure the perfect adhesion of each new layer of canvas on the preceding layer.

The mode of actuating the small hammers may differ from that above described; but the invention comprises the application to the manufacture of pneumatic tires of the system of small hammers or mechanical strikers striking in turn on the gummed and superposed sheets constituting the tire.

As it is necessary in course of manufacture to control the placing of the beads so as not to glue together all the canvas up to the lower edge, two movable pieces 34 are adapted, as shown in plan, to the hammer system and serve to separate the parts not requiring to be glued together.

For setting the beads or flanges, Figs. 4 and 5, there is employed a tool mounted on a bracket 39, which takes the place of the support 38 on the sole-plate 2 of the machine. The bead is engaged by the operator between the former and the profiled roller 40. This is placed in a chape 41, the tail of which is engaged in a boss 42, sliding longitudinally of the axis 43. The spring 44 presses the boss-support 42, and consequently presses the profiled roller 40, on the bead, and so insuring that the latter will adhere to the canvas of the tire. The tension of the spring 44 is regulated by means of hand-wheel 45, the screw-threaded nave of which moves in a nut fixed to the supporting-bracket 46.

The former, rotated in the direction of the arrow by the action of the spring 44, carries round in its rotation the profiled roller 40 and also the bead itself, which thus is wound and adheres to the tire at the exact position it ought to occupy. Additional rollers suitably profiled insure in the same manner the final adhesion of the upper layers of canvas on the bead thus fixed. There only remains then to effect a single operation, the simplest of all, the mounting of the exterior layer of rubber.

This is done by replacing the bracket 39, carrying the bead-rollers, by a bracket 47, Fig. 6, arranged to receive a distributing-drum 48, on which has been rolled the rubber band previously calendered and constituting the rolling face of the tire. The adhesion of the gummed canvas body on the former is insured by a forming-roller 49, the chape of which is carried by the bracket 47. The pressure of said roller 49 on the former is obtained by an arrangement similar to that of the bead-rollers or any other suitable mechanical arrangement for this purpose. The rubber band being mounted on the former between the latter and the roller 49, the former is turned and rotating the band therewith causes to turn the roller 49 and the drum 48. The preparation of the tire is then complete. All the operations have been mechanically effected and the tire is ready for vulcanization.

Having now described my invention, what I claim as new, and desire to secure by Letters Patent, is—

1. A machine for the production of pneumatic tires comprising in combination a circular metallic former coated with rubber solution, a rotary plate 8, extensible arms 8' mounted on said plate and adapted to receive the circular metallic former, a bobbin 13 which furnishes the gummed canvas, rollers 15 and 16 over which pass the canvas, a bulbed roller 17 applied against the former and over which passes the canvas before it is applied on said former, small articulated hammers or mechanical strikers 30, 31 of different length and disposed in series on each side of the former, rotary cams 24 adapted to actuate said strikers, and springs 32 adapted to press the strikers against the former, substantially as and for the purpose set forth.

2. A machine for the production of pneumatic tires comprising in combination a circular metallic former coated with rubber solution, a rotary plate 8, extensible arms 8' mounted on said plate and adapted to receive the circular metallic former, a bobbin 13 which furnishes the gummed canvas, rollers 15 and 16 over which pass the canvas, a bulbed roller 17 applied against the former and over which passes the canvas before it is applied on said former, small articulated hammers or mechanical strikers 30, 31 of different length and disposed in series on each side of the former, rotary cams 24 adapted to actuate said strikers, springs 32 adapted to press the strikers against the former, two profiled rollers 40 adapted to secure the beads or flanges to the tire, sliding supports 42 carrying said rollers, springs 44 acting on said supports and causing the rollers to be pressed against the cheeks of the former, substantially as and for the purpose set forth.

3. A machine for the production of pneumatic tires comprising in combination a circular metallic former coated with rubber solution, a rotary plate 8, extensible arms 8' mounted on said plate and adapted to receive the gummed canvas, rollers 15 and 16 over which pass the canvas, a bulbed roller 17 applied against the former and over which passes the canvas before it is applied on said, former, small articulated hammers or mechanical strikers 30, 31 of different length and disposed in series on each side of the former, rotary cams 24 adapted to actuate said strikers, springs 32 adapted to press the strikers against the former, a drum 48 for distributing the external layer of rubber, a roller 49 adapted to apply said layer of rubber against the body of the gummed canvas mounted on the former, and a spring adapted to press said roller against the former, substantially as and for the purpose set forth.

In testimony whereof I have signed my name to this specification in the presence of two subscribing witnesses.

AMÉDÉE ETIENNE VINCENT.

Witnesses:
   ANTOINE LAVOIX,
   ARMAND BLOCH.